(12) United States Patent
Dimke et al.

(10) Patent No.: US 8,640,619 B1
(45) Date of Patent: Feb. 4, 2014

(54) USE OF POLYAMIDE THERMAL PLASTICS AS LOW COST ELECTRONICS POTTING COMPOUNDS FOR MUNITIONS APPLICATIONS

(75) Inventors: Mark T. Dimke, Cedar Rapids, IA (US); Marty B. McGregor, Robins, IA (US); Alan P. Boone, Swisher, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 143 days.

(21) Appl. No.: 13/296,373

(22) Filed: Nov. 15, 2011

(51) Int. Cl.
*F42D 1/055* (2006.01)
(52) U.S. Cl.
USPC .......................................... 102/200; 102/293
(58) Field of Classification Search
USPC ............................................. 102/200–277.2
See application file for complete search history.

(56) References Cited

U.S. PATENT DOCUMENTS

| | | | | |
|---|---|---|---|---|
| 3,340,439 A | * | 9/1967 | Yeager et al. | 361/790 |
| 3,971,320 A | * | 7/1976 | Lee | 102/202.9 |
| 5,153,368 A | * | 10/1992 | Fogle, Jr. | 102/202.2 |
| 5,271,327 A | * | 12/1993 | Filo et al. | 102/207 |
| 6,341,562 B1 | * | 1/2002 | Brisighella | 102/202.14 |

* cited by examiner

*Primary Examiner* — Samir Abdosh
(74) *Attorney, Agent, or Firm* — Donny P. Suchy; Daniel M. Barbieri

(57) ABSTRACT

The present invention is directed to use of a polyamide thermal plastic as a potting compound for potting electronic components (ex.—printed circuit boards) of an electronics assembly which is implemented in a munition. Use of the polyamide thermal plastic as a potting compound allows for a gun-hardened electronics assembly. Use of the polyamide thermal plastic as a potting compound also allows for reworkability. For example, during early testing phases of the electronics assembly, the potting material of the present disclosure may be removable (ex.—such as via a hot solvent bath) from the electronics assembly so that the electronics components may be: examined to determine the cause(s) for low yield during testing; and/or fixed, rather than having to rebuild the entire electronics assembly, thereby promoting lower costs of producing the electronics assembly.

13 Claims, 3 Drawing Sheets

USE OF POLYAMIDE THERMAL PLASTICS AS LOW COST ELECTRONICS POTTING COMPOUNDS FOR MUNITIONS APPLICATIONS

FIELD OF THE INVENTION

The present invention relates to the field of munitions and more particularly to the use of polyamide thermal plastics as low cost electronics potting compounds for implementation within munitions.

BACKGROUND OF THE INVENTION

Compounds which are currently utilized for the potting of electronics in munitions applications may have sizeable drawbacks associated with them.

Thus, it would be desirable to utilize a compound for the potting of electronics in munitions applications which addresses the problems associated with currently implemented solutions.

SUMMARY OF THE INVENTION

Accordingly an embodiment of the present invention is directed to an electronics assembly, including: a housing; at least one electronic component disposed within the housing; and a potting material, the potting material disposed between the electronic component and the housing, the potting material being one of: a polyamide adhesive, a molded polyamide, a moldable polyamide, a polyamide thermal plastic, a hot melt adhesive (HMA), an unfilled hot melt adhesive, and an unfilled thermoplastic hot melt adhesive, wherein the electronics assembly is a munition electronics assembly configured for being implemented within a munition.

A further embodiment of the present invention is directed to a munition, including: a body, the body forming a cavity; a payload, the payload being disposed within the cavity; and an electronics assembly, the electronics assembly being disposed within the cavity of the munition, the electronics assembly including: a housing; at least one electronic component disposed within the housing; a potting material, the potting material disposed between the electronic component and the housing, the potting material being one of: a polyamide adhesive, a molded polyamide, a moldable polyamide, a polyamide thermal plastic, a hot melt adhesive (HMA), an unfilled hot melt adhesive, and an unfilled thermoplastic hot melt adhesive, wherein the electronics assembly is a guidance system for the munition.

An additional embodiment of the present invention is directed to an electronics assembly, including: a housing; at least one electronic component disposed within the housing, the at least one electronic component including a plurality of printed circuit boards; a plurality of connectors, the plurality of connectors being located between the plurality of printed circuit boards and configured for physically and electrically connecting the printed circuit boards; and a potting material, the potting material disposed between the electronic component and the housing, the potting material being one of: a polyamide adhesive, a molded polyamide, a moldable polyamide, a polyamide thermal plastic, a hot melt adhesive (HMA), an unfilled hot melt adhesive, and an unfilled thermoplastic hot melt adhesive, wherein the electronics assembly is a Global Positioning System electronics assembly configured for being implemented as part of a guidance system within a munition.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
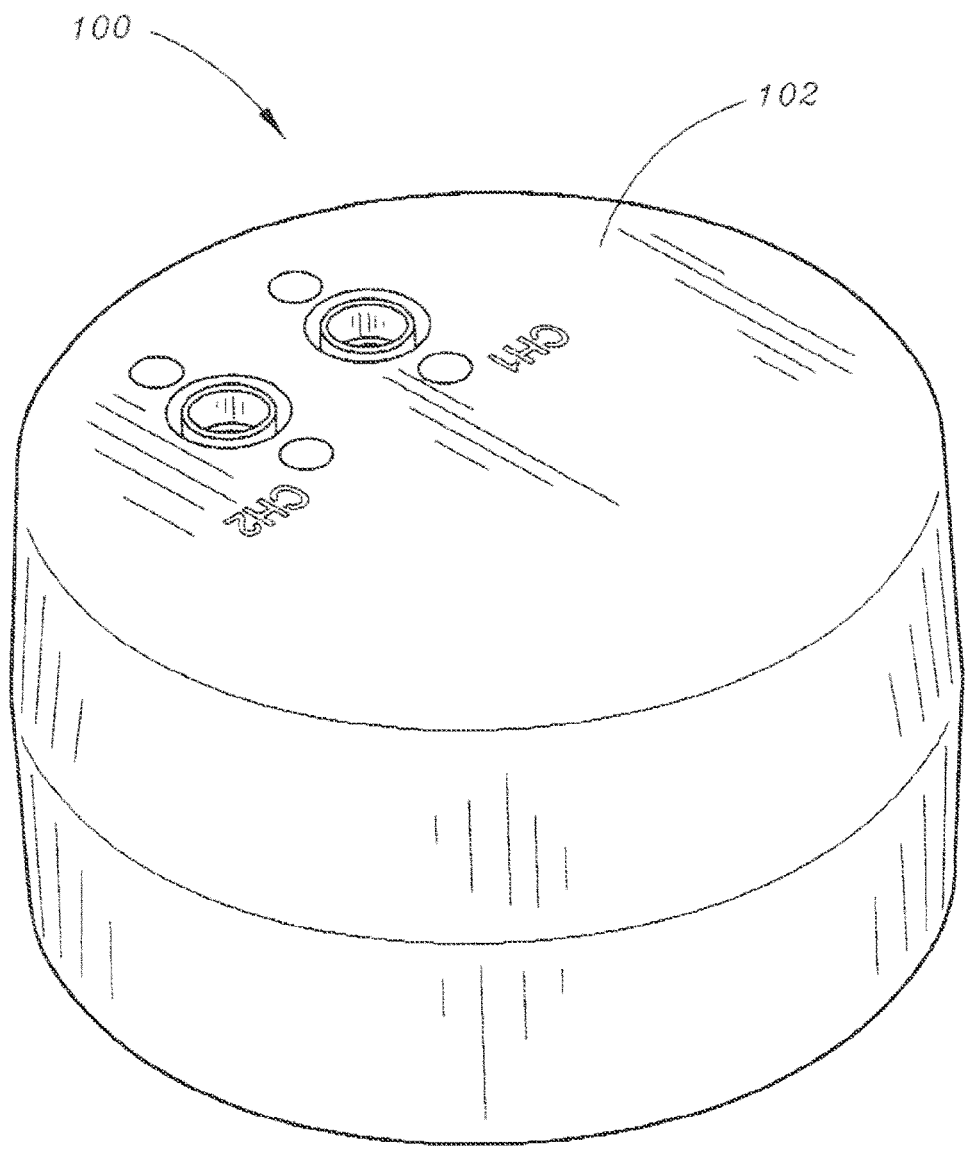
FIG. 1 is an isometric view of an electronics assembly configured for use on-board (ex.—within) a munition, in accordance with an exemplary embodiment of the present disclosure.

Reference will now be made in detail to the presently preferred embodiments of the invention, examples of which are illustrated in the accompanying drawings.

Many munitions which are currently available, such as explosive-bearing projectiles, artillery shells, mortar rounds, bombs, missiles, and the like, may include an electronics assembly. For example, such munitions may be precision-guided munitions in which the electronics assembly (ex.—a Global Positioning System (GPS) electronics assembly) is located within an interior area (ex.—cavity) of the munition. The GPS electronics assembly may include a housing which contains electronic components (ex.—printed circuit boards) and which may be configured for dynamically facilitating precision guidance of the munition towards an intended destination or target. However, in order for the electronics assembly to carry out such in-flight functionality, the electronic components of the electronics assembly must be protected (ex.—shielded) from the shock and vibration forces which accompany the initial launching (ex.—firing; shooting) of the munition. Further, the electronics of the electronics assembly must also be protected (ex.—insulated from) moisture, corrosive materials, extreme temperatures, and/or the like.

Potting is a process in which a solid compound (ex.—potting compound) may be placed within the housing of the electronics assembly for protecting (ex.—shielding; insulating) the electronic components of the electronics assembly from the aforementioned shock forces, vibration forces, corrosive materials and/or extreme temperatures. A number of currently utilized electronics assemblies implement a can-and-potting approach in which the housing of the electronics assembly is a metal (ex.—aluminum) receptacle or can, the electronics components (ex.—printed circuit boards) are housed within the metal can, and the metal can is at least substantially filled with a high end, premixed epoxy potting compound for protecting the electronics components.

One disadvantage with the can-and-potting approach is that the aluminum parts (ex.—the metal can) which are included in that type of electronics assembly are expensive. Another disadvantage with the can-and-potting approach is that the epoxy potting compounds used in that type of electronics assembly are also expensive. A further disadvantage with the can-and-potting approach is that once the epoxy potting compound is placed within the electronics assembly, it does not allow for rework (ex.—removal) of the potting compound. For instance, during an initial testing phase of the electronics assembly, if epoxy compound has been used as the potting compound in the electronics assembly, it may be difficult to impossible to go in and examine and/or remove the electronic components to determine what has gone wrong with them when the testing reveals that yields are low, thereby significantly adding to the cost of manufacturing such electronics assemblies.

The present disclosure describes the use of a potting compound in an electronics assembly for munitions applications which addresses the above-referenced disadvantages associated with currently implemented potting approaches, while providing the requisite protection (ex.—shielding; insulating) of the electronic components of the electronics assembly from the shock forces, vibration forces, corrosive materials and/or extreme temperature environments which the munitions may be subjected to.

Figure 2:
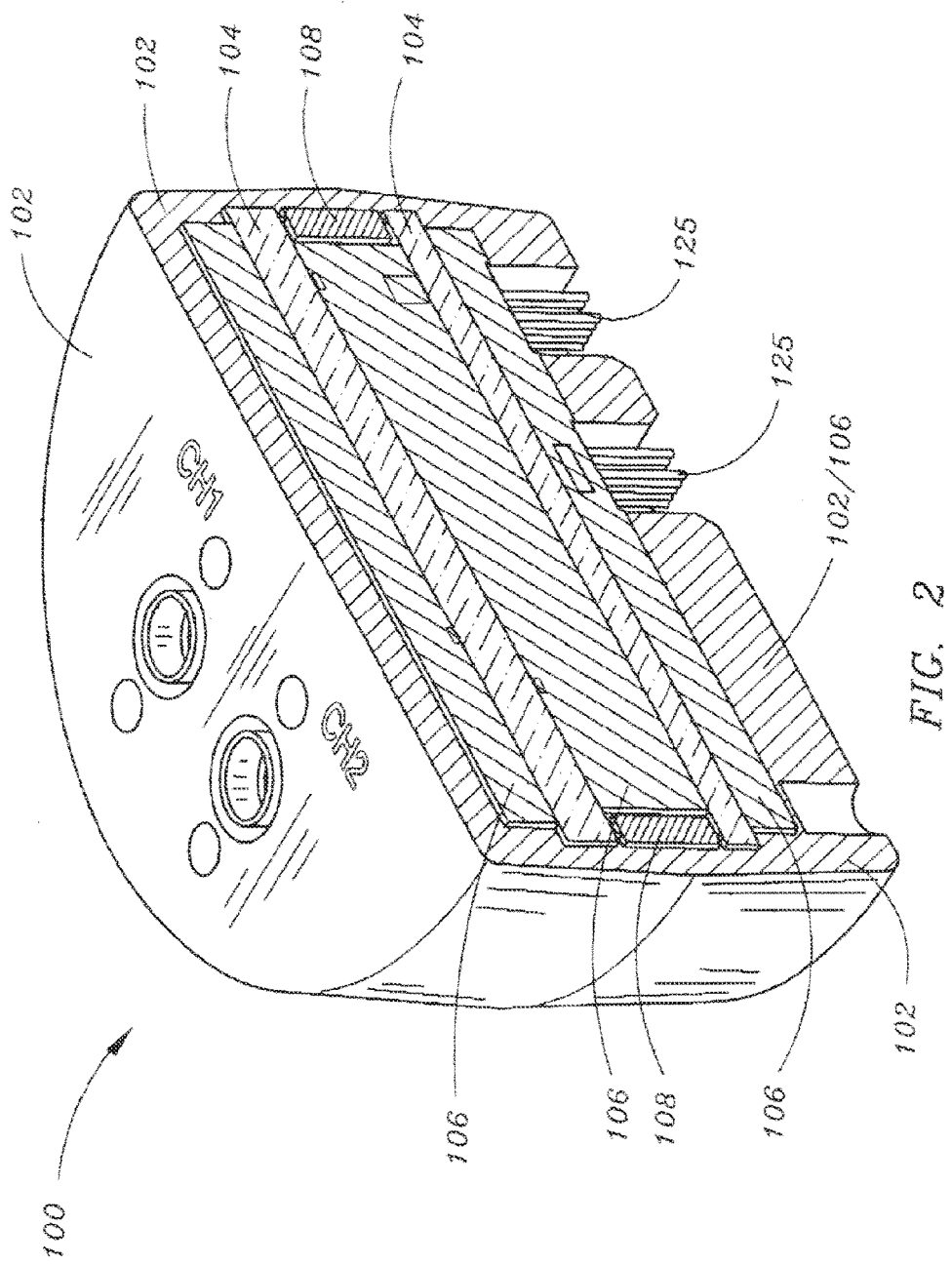
FIG. 2 is a cross-sectional view of the electronics assembly of FIG. 1, in accordance with an exemplary embodiment of the present disclosure.
Figure 3:
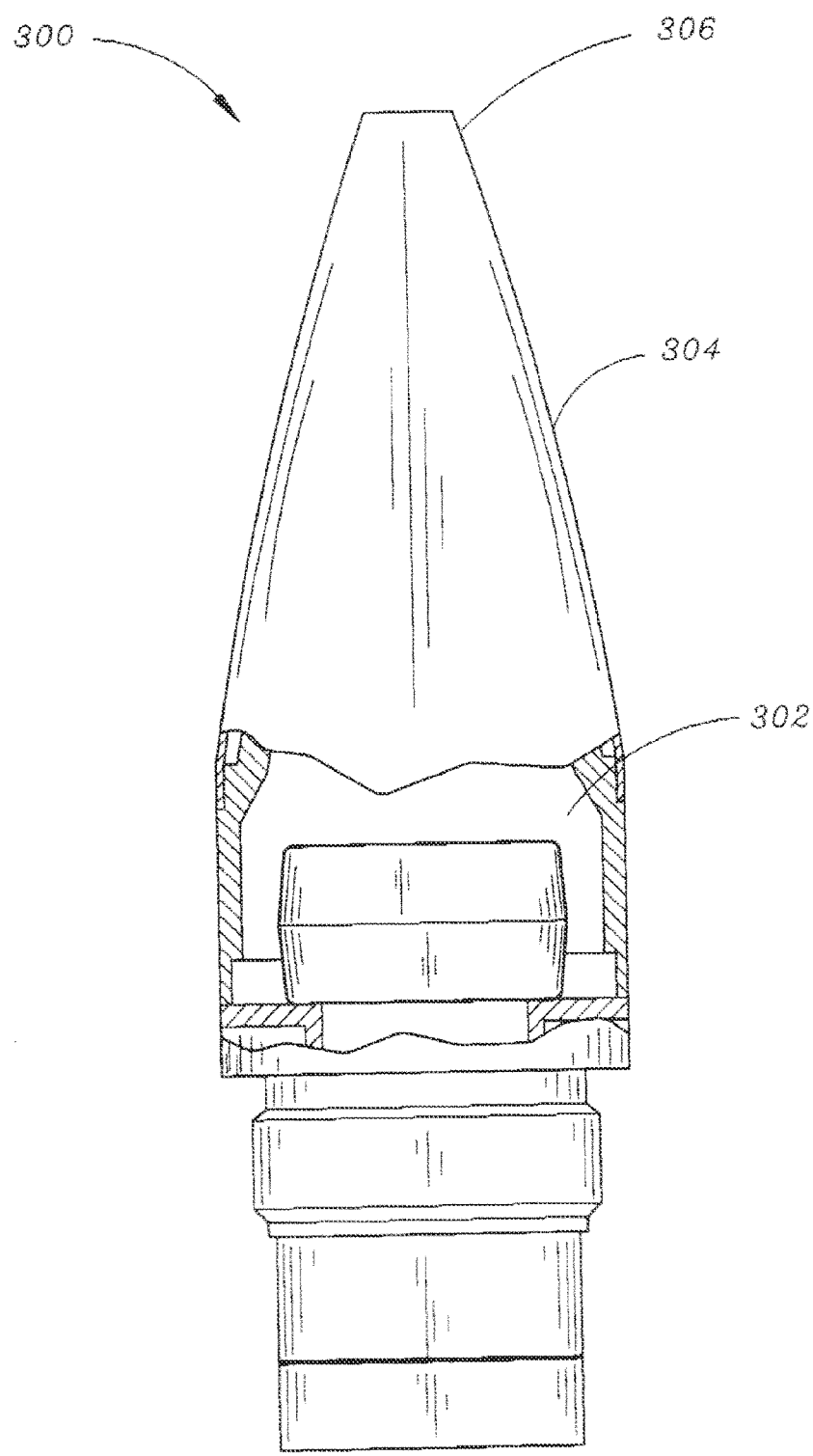
FIG. 3 is a cutaway view of a munition, the munition including the electronics assembly shown in FIGS. 1 and 2, in accordance with an exemplary embodiment of the present invention.

Referring now to FIGS. 1 and 2, an electronics assembly for use in a munition (as shown in FIG. 3) in accordance with an exemplary embodiment of the present disclosure is shown. In exemplary embodiments, the electronics assembly 100 may be a Global Positioning System (GPS) electronics assembly configured for providing precision guidance of the munition 300 towards its intended destination. In further embodiments, the munition 300 may be: a guided projectile (ex.—a precision-guided projectile; a smart munition); an explosive-bearing projectile; an artillery shell; a mortar round; a bomb; a missile and/or the like. Still further, the munition 300 may be configured for being launched or fired from a cannon, mortar, or similar type of gun.

In exemplary embodiments, the electronics assembly 100 may be implemented (ex.—configured; located; disposed) within an interior area (ex.—cavity) 302 of the munition 300. For example, the electronics assembly 100 may be physically and/or electrically connected to a body portion 304 of the munition 300 and/or to other electronics assemblies (not shown) of the munition 300. For example, the electronics assembly 100 may include electrical connectors 125 for connecting (ex.—communicatively coupling) the electronics assembly 100 with other electronics assemblies of the munition 300. The munition 300 may further include a fuse (not shown) which may be disposed at the nose 306 of the munition 300 and is typically physically contiguous with the body 304 of the munition 300. The fuse may be a mechanical or electronic device utilized for detonating an explosive charge, such as the charge or payload of the munition 300.

In embodiments of the present disclosure, the electronics assembly 100 may include a housing 102. For example, the housing 102 may be a generally cylindrical-shaped housing 102. The housing 102 may be any of a variety of shapes which may be implemented within the munition 300.

In exemplary embodiments of the present disclosure, the electronics assembly 100 may include electronic components 104 disposed within the housing 102. For example, the electronic components 104 may be one or more printed wiring boards (ex.—printed circuit boards). In further embodiments, the electronic components 104 may be connected to (ex.—may be seated within recesses formed by interior surfaces of) the housing 102. Further, the electronics components 104 may be spaced apart from each other as shown in FIGS. 1 and 2.

In embodiments of the present disclosure, the electronics assembly 100 may include a potting material (ex.—potting compound) 106. The potting compound 106 may be located (ex.—disposed) within the housing 102 and may be disposed between, against and/or around the electronic components 104. For instance, the potting compound 106 may be disposed above and below (ex.—on top of and beneath) the electronics components 104. Further, the potting compound 106 may be located (ex.—disposed) between the electronics components 104 and the housing. For example, the potting compound 106 may fill an area(s) between the electronic components 104 and the housing 102 and may also fill an area(s) between the electronic components 104. Further, the potting compound 106 may be a polyamide adhesive, a molded polyamide, a moldable polyamide, a polyamide thermal plastic (ex.—Macromelt®), a hot melt adhesive (HMA), an unfilled hot melt adhesive, and/or an unfilled thermoplastic hot melt adhesive. The potting compound 106 (ex.—polyamide thermal plastic) may be configured for providing the requisite protection (ex.—shielding; insulating) of the electronic components 104 of the electronics assembly 100 from the shock forces, vibration forces, corrosive materials and/or extreme temperature environments which the electronics assembly 100 may be subjected to. Thus, the use of polyamide thermal plastic as a potting material 106 may provide for gun-hardened electronic components 104. For instance, the use of polyamide thermal plastic as a potting material 106 may allow the electronics assembly 100 (ex.—electronic components 104) to withstand up to 50,000 g forces during rail gun testing of a munition implementing the electronics assembly 100 and still maintain its functionality. Further, the use of polyamide thermal plastic as a potting material 106 may also allow for reworkability. For example, during early testing phases of the electronics assembly 100, the potting material 106 of the present disclosure may be removable (ex.—such as via a hot solvent bath) from the electronics assembly 100 so that the electronics components 104 may be: examined to determine the cause(s) for low yield during testing; and/or fixed, rather than having to rebuild the entire electronics assembly 100, thereby promoting lower costs of producing the electronics assembly.

In exemplary embodiments of the present disclosure, the electronics assembly 100 may further include one or more connectors 108. For example, the connectors 108 may be disposed between the electronic components (ex.—the printed circuit boards) 104, may be configured for electrically connecting the printed circuit boards 104 and may be configured for physically connecting to the printed circuit boards 104.

In further embodiments, the potting compound 106 may be configured with a low enough modulus that coefficient of thermal expansion (CTE) is not a driving force. In embodiments of the present disclosure, the housing 102 may be at least partially constructed of the potting compound 106 described above.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A munition, comprising:
a body, the body forming a cavity;
a payload, the payload being disposed within the cavity; and
an electronics assembly, the electronics assembly being disposed within the cavity of the munition, the electronics assembly including: a housing; at least one electronic component disposed within the housing; a potting material disposed between the at least one electronic component and the housing, the potting material being one of: a polyamide adhesive, a molded polyamide, a moldable polyamide, a polyamide thermal plastic, a hot melt adhesive (HMA), an unfilled hot melt adhesive, and an unfilled thermoplastic hot melt adhesive,
wherein the at least one electronic component includes: a plurality of printed circuit boards; and a plurality of connectors, the plurality of connectors being located between the plurality of printed circuit boards and configured for physically and electrically connecting the printed circuit boards.

2. A munition as claimed in claim 1, wherein the potting material also forms at least a portion of the housing.

3. A munition as claimed in claim 1, wherein the munition is one of: an explosive-bearing projectile, artillery shell, mortar round, bomb, missile, and a precision-guided munition.

4. A munition as claimed in claim 1, further comprising:
a second plurality of electrical connectors, the second plurality of electrical connectors configured for connecting the electronics assembly to a second electronics assembly of the munition.

5. A munition as claimed in claim 1, wherein the electronics assembly comprises a Global Positioning System (GPS) receiver.

6. An electronics assembly, comprising:
a housing;
at least one electronic component disposed within the housing, the at least one electronic component including a plurality of printed circuit boards;
a plurality of connectors, the plurality of connectors being located between the plurality of printed circuit boards and configured for physically and electrically connecting the printed circuit boards; and
a potting material, the potting material disposed between the electronic component and the housing, the potting material being one of: a polyamide adhesive, a molded polyamide, a moldable polyamide, a polyamide thermal plastic, a hot melt adhesive (HMA), an unfilled hot melt adhesive, and an unfilled thermoplastic hot melt adhesive,
wherein the electronics assembly is designed to fit within a cavity of a munition bearing a payload, and wherein the at least one electronic component of the electronics assembly is configured to guide the munition towards an intended destination or target.

7. An electronics assembly as claimed in claim 6, wherein the potting material also forms at least a portion of the housing.

8. An electronics assembly as claimed in claim 6, wherein the munition is one of: an explosive-bearing projectile, artillery shell, mortar round, bomb, missile, and a precision-guided munition.

9. An electronics assembly as claimed in claim 6, further comprising:
a second plurality of electrical connectors, the second plurality of electrical connectors configured for connecting the electronics assembly to a second electronics assembly of the munition.

10. An electronics assembly as claimed in claim 6, wherein the munition is a precision-guided munition.

11. An electronics assembly as claimed in claim 6, wherein the potting material is a polyamide thermal plastic.

12. An electronics assembly as claimed in claim 6, wherein the electronics assembly comprises a GPS receiver.

13. A munition as claimed in claim 1, wherein the at least one electronic component of the electronics assembly is configured to guide the munition towards an intended destination or target.

* * * * *